Feb. 26, 1946.  L. C. MILLER  2,395,574
READING DEVICE
Original Filed April 24, 1941  2 Sheets-Sheet 1
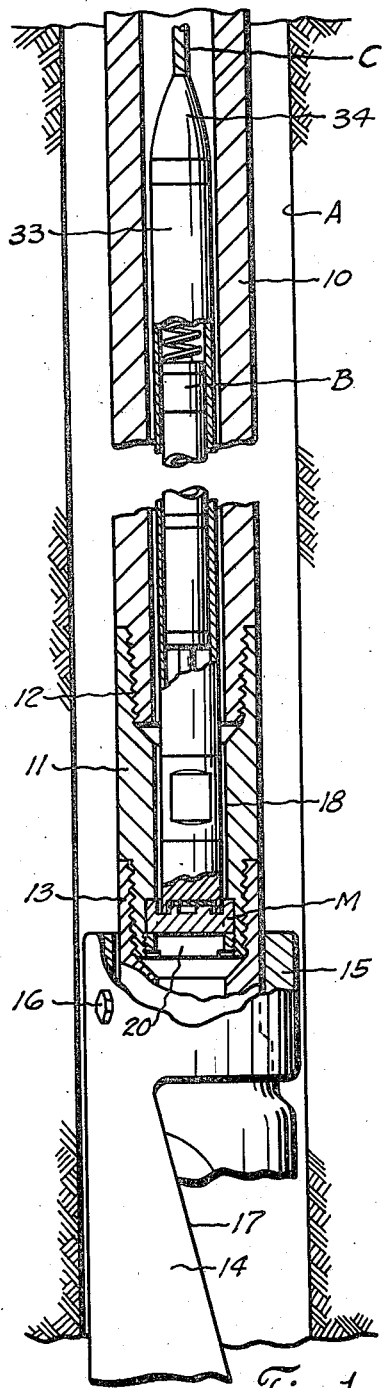
Fig. 1
Fig. 3
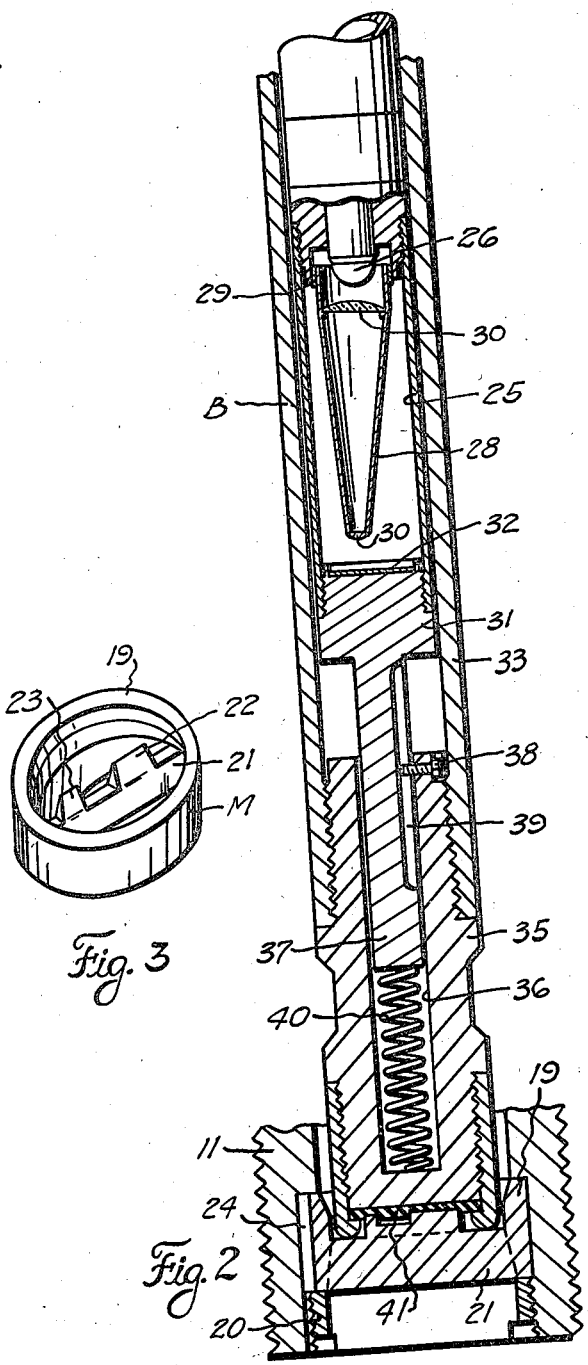
Fig. 2
INVENTOR.
Leonidas C. Miller
BY Joe E. Edwards
ATTORNEY Feb. 26, 1946. L. C. MILLER 2,395,574
READING DEVICE
Original Filed April 24, 1941 2 Sheets-Sheet 2
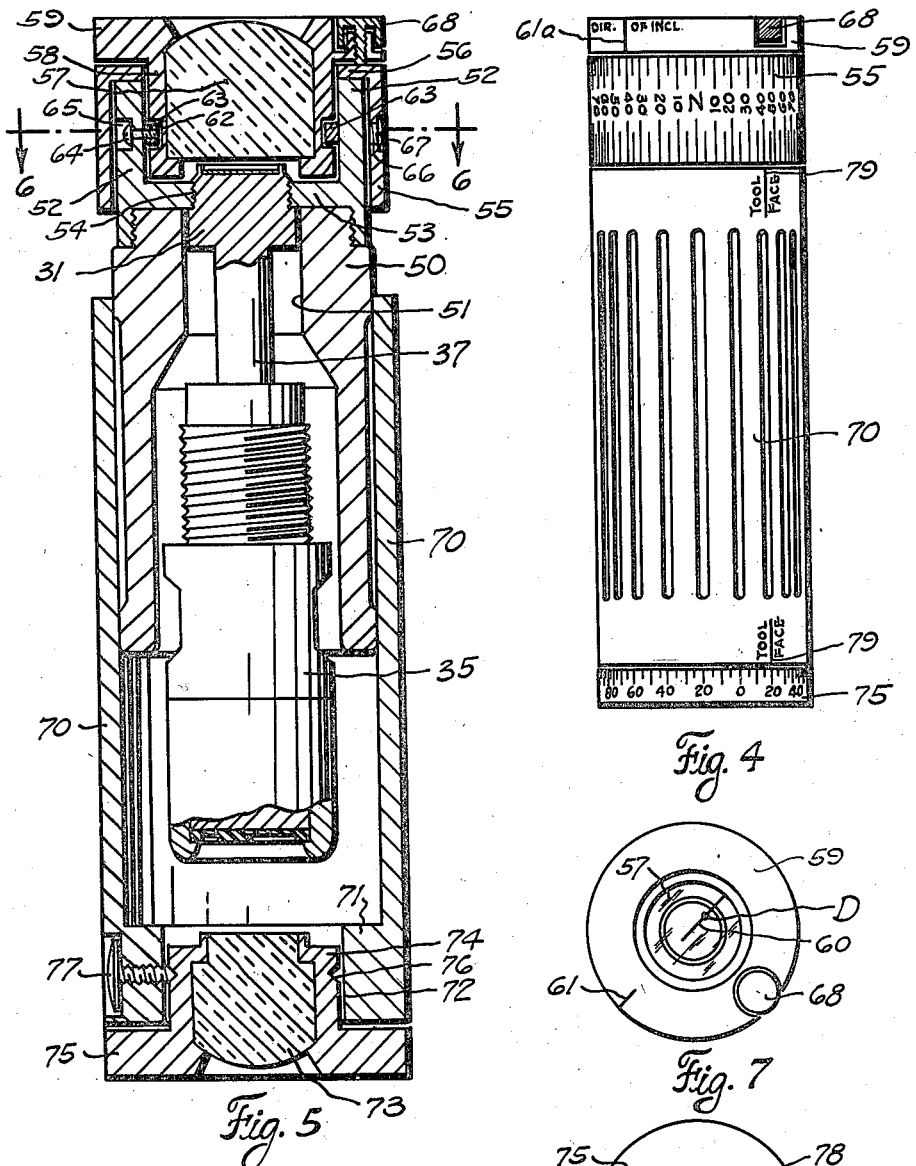
INVENTOR.
Leonidas C. Miller
BY Joe E. Edwards
ATTORNEY Patented Feb. 26, 1946

2,395,574

UNITED STATES PATENT OFFICE 2,395,574

READING DEVICE

Leonidas C. Miller, Los Angeles, Calif., assignor of one-half to Eastman Oil Well Survey Company, Dallas, Tex., a corporation of Delaware, and one-half to Eastman Oil Well Survey Corporation, Long Beach, Calif., a corporation of California Original application April 24, 1941, Serial No. 390,027. Divided and this application October 18, 1943, Serial No. 506,705

6 Claims. (Cl. 33—1)

This invention relates to new and useful improvements in reading devices.

This application is filed as a division of my co-pending application, Serial Number 390,027, filed April 24, 1941.

One object of the present invention is to provide an improved reading device for quickly and accurately interpreting a double record made by a well surveying instrument.

An important object of the invention is to provide an improved reading device which is adapted to receive an element having an inclination indicating record at one end and a tool indicating record at its opposite end; said reading device being constructed so that the two records may be quickly and accurately correlated, whereby the azimuthal position of a tool, as represented by the record, may be determined.

Still another object of the invention is to provide an improved reading device for interpreting a double record which includes a rotatable dial for each record, said dials being readily adjustable to facilitate the accurate correlation of the two records, said device entirely eliminating human error in ascertaining the azimuthal position of one record with respect to the other.

A further object of the invention is to provide an improved reading device which is simple in construction and which includes a minimum number of parts; said device being arranged to receive that portion of the survey instrument which carries the double record, whereby the records may be removed from the instrument and inserted into the reader as a unit, which obviates any error due to said records changing relative positions due to handling.

A particular object of the invention is to provide an improved reading device, of the character described, which is easily manipulated and adjusted, whereby it may be accurately used by unskilled workmen.

A construction designed to carry out the invention will be hereinafter described together with other features of the invention.

The invention will be more readily understood from a reading of the following specifications and by reference to the accompanying drawings, wherein:

Figure 1 is an enlarged vertical sectional view of the lower portion of a drill stem and sub having an instrument for making the double record lowered therein, Figure 2 is an enlarged transverse vertical sectional view of the instrument, Figure 3 is an isometric view of the marking member, Figure 4 is an elevation of a reading device constructed in accordance with the invention;

Figure 5 is an enlarged vertical sectional view of the reading device and showing the indicating element of the instrument in position therein, Figure 6 is a horizontal cross-sectional view taken on the line 6—6 of Figure 5, Figure 7 is a plan view of the parts shown in Figure 5, and Figure 8 is a bottom view of the parts shown in Figure 5.

This invention is a division of my co-pending application, Serial Number 390,027 filed April 24, 1941, and relates primarily to a reading device for interpreting a double record. The reading device is adapted to interpret two records one of which is located at one end of an element with the other located at the opposite end thereof and it is preferable although not essential that the element which carries the two records be elongate and generally cylindrical in shape. So far as the present invention is concerned it makes no difference how the two records are obtained and merely for the purpose of illustration, the particular instrument and records shown in my co-pending application will be briefly described. However, the invention is not to be limited to producing the records to be interpreted in this manner.

Figures 1 to 3 illustrate one type of apparatus by which a double record may be obtained. Referring to Figure 1, a drill stem 10 is lowered into a well bore A and an elongate cylindrical sub 11 is threaded onto the lower end of said stem, the sub being formed with an internally screw-threaded box 12 for receiving the drill pipe at its upper end. The lower end of the sub 11 is reduced and is externally screw threaded whereby the upper end of a drill bit 13 may be secured thereto. A whipstock 14 or other tool to be oriented, is provided with a collar 15 which is preferably made integral with its upper end and this collar surrounds the drill bit 13, being secured thereto by means of a shear pin 16.

When the drill stem is lowered through the well bore A the whipstock as well as the drill bit are lowered therewith. A rotation of the drill stem will impart a rotation to the whipstock whereby said whipstock may be oriented within the well bore in a desired manner. A downward jar on the drill stem will result in the shearing of the pin 16 whereby the drill bit 13, sub 11 and drill stem 10 may move downwardly through the collar 15 of the whipstock; upon such movement the bit is guided by the angular face 17 of said whipstock. The sub 11 has an axial bore 18 which is of substantially the same diameter as the drill stem 10 and the lower portion of the bore 18 is enlarged to receive a marking element M. The element is clearly shown in Figure 3 and includes a collar 19 which is insertable within the lower portion of the bore and which is retained therein by a retaining ring 20. A diametrically extending bar 21 which is preferably made integral with the collar 19 bridges or spans the bore of the sub and this bar is provided with an upstanding knife-edge projection 22. The bar is also provided with a smaller knife-edge lug 23 which extends upwardly therefrom. The marking element M is of course nonrotatable within the bore of the sub, being held so by a key 24.

The diametrically extending marking element M is thus fixed within the bore of the sub. When the whipstock 14 or other tool is secured to the sub by its connection to the drill bit 13 the guiding or inclined face 17 of the said whipstock will bear a definite relation to the marking element. It would of course be desirable to locate the face of the whipstock in vertical alinement with the diametrically extending bar 21 whereby the enlarged projection 22 of said bar will lie in the same vertical plane as the face of said whipstock. However, in view of the threaded connection between the drill bit and the sub 11, it would be substantially impossible to always locate the face 17 of the said whipstock in the same vertical plane as the projection 22.

Therefore, after the whipstock has been secured to the drill bit the misalinement or the relationship of the face of the whipstock to the projection 22 is determined. This may be done in any of a number of ways, as for example, by employing an alining clamp which is illustrated and described in my co-pending application above referred to.

After the angular differences between the whipstock face and the marking element M has been determined, the drill stem is lowered into the well bore A and the whipstock is located at the point in the well at which it is to be set. Ordinarily a preliminary survey of the well bore at this point has been made and the inclination and direction of inclination of the well bore is known. Thus, when the drill stem and whipstock are lowered, the operator knows the direction of inclination of the well at the elevation of the whipstock and he also knows the angular difference between the face 17 of said whipstock and the marking projection 22 within the bore of the sub.

A suitable inclination indicating instrument B is then lowered by means of a wire line or cable. This instrument is clearly described in my co-pending application and has been illustrated in Figures 1 and 2. The instrument includes an elongate shell or housing 25 which is provided with a light source such as an electrical lamp 26 which lamp is located intermediate the ends of said housing. The lamp is supplied with electrical current from batteries which are housed within the upper portion of the housing. Above the batteries the instrument may have the usual timing mechanism (not shown) for closing the circuit to the lamp after a predetermined lapse of time. Below the lamp or light source 26, a tubular plumb bob 28 is mounted by means of a Cardian suspension 29 whereby said plumb bob is adapted to undergo universal movement. The plumb bob is tapered or reduced toward its lower end and is provided with suitable lenses 30 for focusing or concentrating the light beam passing therethrough. The lower end of the shell or housing is closed by a plug 31 which has its upper end recessed to receive an indicating element or disc 32. The disc is constructed of a light, sensitive paper, such as printing out proof paper which is capable of being exposed or printed out by means of exposure to light.

The instrument B is disposed within an elongate casing 33 which has a cable socket 34 at its upper end. The lowering cable C for lowering the assembly through the drill stem is attached to this socket.

The lower end of the casing 33 has the upper end of a coupling 35 threaded therein and this coupling has a bore 36 which receives a depending stem 37 extending downwardly from the plug 31 of the instrument B. The stem 37 telescopes the coupling and is nonrotatably confined therein by means of a screw 38 which rides within a vertical groove 39. A shock absorbing spring 40 is confined in the lower end of the bore of the coupling and obviously the instrument B is capable of a longitudinal movement with reference to said coupling.

The bottom of the coupling is provided with an impression plate 41 which is constructed of lead or other soft metal and this plate is nonrotatably secured to said coupling. Since the impression plate 41 is secured to the bottom of the housing 33 and also since the instrument B is nonrotatably mounted within the casing it is evident that the paper indicating element or disc 32 which is carried by the plug 31 cannot rotate with respect to the impression plate.

The instrument B which is located within the housing as above described is lowered downwardly to the position shown in Figure 1 at which point the impression plate 41 engages the projection 22 and lug 23 of the marking element. The knife-edges of the projection and lug will indent or mark the impression plate as illustrated at "I" in Figure 8. The instrument remains in this position until the timing mechanism is actuated to illuminate the light source or lamp 26.

Of course when the instrument comes to rest the plumb bob being universally mounted, remains in a vertical position. The instrument will of course incline in accordance with the inclination of the well bore and thus the lower end of the plumb bob will be swung off center of the indicating disc 32. Upon operation of the instrument, the light beam is directed downwardly onto the disc 32 and will expose or print out a portion of the paper to form a single dot D (Figure 7) on the paper. It is manifest that this dot is representative of the direction of the low side of the hole and the number of degrees which said dot is off center will indicate the number of degrees of inclination of the well bore. Since the disc 32 is nonrotatable and fixed with respect to the impression plate 41, it is obvious that the dot D will bear a definite relationship to the diametrically extending indentations "I" which have been formed on the impression plate by the projection 22 and the lug 23.

The instrument assembly is then brought to the surface and the plug 31 removed from the instrument housing with the coupling 35 removed from the outer casing 33. Upon such removal it will be obvious that a double record is had. The record on the disc 32 indicates the low side of the well bore and the indentation made by the projection 22 indicates the position of the whipstock. The present invention is concerned with interpretating this double record, that is, accurately correlating the two indications so that the exact position of the whipstock may be ascertained.

The present invention consists of the reading device illustrated in Figures 4 to 8 and includes a tubular body 50 which is formed with an axial bore 51 the upper end of which is reduced. A supporting collar 52 is threaded onto the upper end of the body 50 and has a transverse partition or plate 53 formed integral therewith and extending across its bore nearer the lower end of the collar. An axial screw-threaded opening 54 is provided in the plate or partition 53, said opening being slightly less than the diameter of the upper end of the bore 51 of the body. When the collar 52 is in position on the body, the underside of the plate or partition engages the upper edge of said body. An annular graduated dial element 55 having the points of the compass marked off in degrees thereon, is rotatably mounted on the collar 52, said dial being provided with an inwardly directed overhanging flange 56 which overhangs the upper edge of the collar 52. Manifestly, the dial 55 may be rotated around the collar 52 and with relation to the body 50. A circular lens or transparent window 57 is mounted within an annular lens carrier 58 which is insertable within the collar 52. The lens carrier is formed with an outwardly directed annular flange 59 which overlies the inwardly directed flange 56 of the dial. The lens 57 is provided with a diametrically extending indicating line 60 which extends substantially from the center of the lens to the outer periphery thereof. 180 degrees opposite the outer end of the indicating line 60 is an indicating mark 61, which is formed on the upper edge of the flange 59 of the lens carrier. This mark may be extended downwardly as shown at 61a on the periphery of the flange, whereby said mark may be readily alined with the indications on the dial 55.

For rotatably confining the carrier 58 within the collar 52, an annular groove or recess 62 is provided in the outer surface of the carrier nearer the lower end thereof. A plurality of retaining shoes 63 are disposed within the groove 62, said shoes being fastened to the collar by means of suitable screws 64. The outer end of each opening which receives the screws 64 is countersunk as illustrated at 65, whereby the head of each screw is below the plane of the outer periphery of the collar 52. For facilitating the insertion and removal of the screws 64 so as to permit assembly and dis-assembly of the device, an enlarged opening 66 extends through the annular dial element and is normally closed by a threaded plug 67. For locking the carrier 58 within the collar 52 and also for locking the dial element 55 against rotation on said collar, a locking screw 68 is threaded through the flange 59 of the carrier and has its lower end adapted to engage the upper surface of the flange 56 of the dial. When the screw 68 is tightened against the flange 56, the carrier 58 is drawn upwardly against the retaining shoes 63 to frictionally lock said carrier against rotation. At the same time, the frictional engagement of the screw 68 with the flange 56 will frictionally lock the compass dial 55 against rotation on the collar 52.

When the plug 31 is removed from the instrument casing 25, as has been explained, said plug is inserted within the bore of the body 50 and the plug is threaded into the opening 54 in the partition 53 below the lens or window 57. Since the plug 31 carries the paper indicating disc which has the dot D imprinted thereon, it will be obvious that said dot will be clearly visible through the lens. The coupling 35 which is connected to the plug 31 through the stem 39 extends outwardly from the lower end of the bore 51 of the body 50, as is clearly shown in Figure 8.

The dot or mark D on the disc 32 is representative of the low side of the well bore and in adjusting the reading device, the lens carrier 58 is rotated so as to aline the indicating line 60 with the dot D, as is clearly shown in Figure 7. When this is done, it is known that the outer end of the indicating line 60 indicates the low side of the well bore and thus, the indicating mark 61 on the flange 59 of the carrier 58, which is 180 degrees opposite the end of the line 60, represents the high side of the well bore or the direction in which the well bore is inclining. As has been explained, a preliminary survey was made prior to the lowering of the instrument B through the drill stem and the direction of inclination of the well bore is known. Assuming this direction to be N. 50 E., then the compass dial element 55 is rotated on the collar 52 so as to aline the reading "N. 50 E." with the indicating mark 61 which is representative of the high side of the hole. After this adjustment is made, the locking screw 68 is tightened downwardly against the flange 56 of the dial element, whereby the dial and the lens carrier 58 are locked against rotation relative to the collar 52.

After proper adjustment of the dial element 55 has been accomplished, as above described, an elongate shell 70 is engaged over the body 50, the inner diameter of this shell being substantially equal to the exterior diameter of said body, whereby a relatively tight fit of the shell on the body is had. The shell is slipped upwardly on the body 50 so that its upper edge is adjacent or contiguous to the lower edge of the compass dial element 55. An internal flange or shoulder 71 is formed within the lower end of the shell, whereby the extreme lower end of the bore of said shell is reduced as indicated at 72. A lens 73 or transparent window which is carried by a lens carrier 74 is rotatably mounted within this reduced portion 72 of the bore. The carrier is formed with an outwardly directed annular flange 75 which is contiguous to the lower edge of the shell. The carrier is formed with an annular recess 76 in its outer periphery and a retaining and locking screw 77 which is threaded through the wall of the shell has its inner end engaging within the recess. Manifestly, the screw retains the lens carrier 74 rotatably within the bore 72; upon tightening of the screw 77, the lens carrier may be locked against rotation within said bore.

The lens 73 is provided with a diametrically extending indicating line 78, which line extends substantially from the center of the lens to the outer periphery thereof. This line is representative of the transversely extending bar 21 of the marking element M and the lens is rotated so as to aline the indicating line 78 with the indentation I previously formed by the knife-edge projection 22 of the marking element M, as is clearly shown in Figure 8.

As has been previously explained, the angular relation between the knife-edge projection 22 of the marking element with respect to the face 17 of the whipstock, was determined prior to lowering of the assembly into the well bore. In order to compensate for this angular difference, the exterior of the shell 70 is provided with indicating lines 79 (Figure 4), which lines are representative of the face 17 of the tool. The periphery of the flange 75 of the lens carrier is marked off in degrees and the zero mark on the periphery is in radial alinement with the outer end of the indicating line 78. The shell 70 is rotated so as to offset its indicating line 79 relative to the zero point, such offsetting being in accordance with the previous determination of the angular difference between the projection 22 and the tool face. As shown in Figure 4, this angular difference is 20 degrees and after this adjustment has been made, the locking screw 77 is tightened to lock the lens carrier 74 to the shell 70.

The shell 70 is thus representative of the tool and the lower indicating line 79 which is adjacent the flange 75 of the lower lens carrier is in vertical alinement with the indicating line 79 on the shell which is adjacent the dial element. After the shell has been adjusted relative to the zero mark so as to compensate for the angular difference between the position of the projection and the tool face, the entire shell is rotated so as to aline the indicating line 78 on the lower lens with the indentations "I" which is representative of the projection 22. After this adjustment is made, it is only necessary to read the compass dial opposite the upper line 79 to obtain the azimuthal position of the face 19 of the tool.

After the reading is determined, it is obvious that the drill pipe may be rotated to properly locate the face 17 of the whipstock in a desired direction. The reading device obviates the necessity of any calculation since the dial gives an accurate visual indication of the exact azimuthal position of the tool. The reading device simulates the various elements which are located within the well bore and therefore after said device is adjusted, the position of the various elements is visually illustrated. It is noted that after the whipstock or tool is connected to the sub with the face 17 in alinement with the projection 22 of the marking member M, it would not be necessary to adjust the lens 73 at the lower end of the shell with respect to the shell. In such instance the line 79 which is representative of the tool face would merely be located opposite the zero indication on the dial of the flange 75 of the lower lens carrier 74.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A reading device for interpreting a double record element including, a tubular body, a transparent window having a diametrically extending indicating line thereon rotatably mounted in one end of the bore of the body, a compass dial element rotatable on the body with respect to the window, an elongate shell rotatable on the body, and a transparent window having a diametrically extending indicating line rotatably mounted in the lower end of the shell.

2. A reading device for determining the angular relationship between two indications on opposite ends of an elongate support, said device including, a tubular body for receiving the elongate support, the ends of said body being open whereby when said support is within the body the indications at the ends of the support are visible, a transparent window having a diametrically extending indicating line thereon rotatably mounted on one end of said body, said indicating line being adapted to be alined with the indication at that end of said body, a compass dial element rotatable on the body with respect to the window, and an elongate shell rotatable on the body and having an indication which is adapted to be adjusted with respect to the second indication on the opposite end of the support within said body.

3. A reading device as set forth in claim 2, with a second transparent window having a diametrically extending indicating line thereon rotatably mounted within the outer end of the shell.

4. A reading device for determining the angular relationship between two indications on opposite sides of a support, said device including, a tubular body for receiving the support, a movable dial element on the upper end of the body and having compass indications thereon, a shell rotatable on the body with respect to the dial element, said dial element being adapted to locate the position of one indication on the support and the shell being adapted to locate the opposite indication, whereby the position of the shell relative to the dial element indicates the angular relationship between said indications, an upper lens rotatably mounted on the body adjacent the dial element and having means for alining the upper indication with the dial, and a lower lens rotatably mounted in the shell and having means for alining the lower indication with a known point on said shell.

5. The combination with a support having an indication representative of well inclination at one end and a second indication representative of a tool position at its opposite end, of a reading device including, a tubular body having its ends open and having means for mounting the support therein so that the indications are visible through the open ends of said body, a movable dial element rotatable on one end of the body and having compass indications thereon, a shell frictionally and rotatably mounted on the body with one end extending beyond the end of the body, said dial element being adapted to be adjusted to indicate the compass position of the indication representative of the direction of inclination of the well bore and said shell being adjustable to locate the position of the indication representative of the tool position, whereby the angular relationship of the two indications may be ascertained, and means on the body and on the shell for accurately alining the indications with the dial element and with the shell.

6. The combination with a support having an indication representative of well inclination at one end and a second indication representative of a tool position at its opposite end, of a reading device including, a tubular body having its ends open and having means for mounting the support therein so that the indications are visible through the open ends of said body, a movable dial element rotatable on one end of the body and having compass indications thereon, a shell frictionally and rotatably mounted on the body with one end extending beyond the end of the body, said dial element being adapted to be adjusted to indicate the compass position of the indication representative of the direction of inclination of the well bore and said shell being adjustable to locate the position of the indication representative of the tool position, whereby the angular relationship of the two indications may be ascertained, a lens rotatably mounted on the body adjacent the compass dial element and having means for alining the upper indication with the dial, and a lower lens rotatably mounted in the shell and having means for alining the lower indication with a known point on said shell.

LEONIDAS C. MILLER.